(12) United States Patent
Kosaka (10) Patent No.: US 9,197,820 B2
(45) Date of Patent: Nov. 24, 2015

(54) LENS APPARATUS AND IMAGE PICKUP APPARATUS CAPABLE OF CONTROLLING APERTURE STOP

(71) Applicant: CANON KABUSHIKI KAISHA, Tokyo (JP)

(72) Inventor: Takashi Kosaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/935,040

(22) Filed: Jul. 3, 2013

(65) Prior Publication Data

US 2014/0016025 A1 Jan. 16, 2014

(30) Foreign Application Priority Data

Jul. 10, 2012 (JP) ................................. 2012-154582

(51) Int. Cl.
*G03B 7/085* (2006.01)
*H04N 5/238* (2006.01)
*H04N 5/232* (2006.01)

(52) U.S. Cl.
CPC ........... *H04N 5/238* (2013.01); *H04N 5/23209* (2013.01)

(58) Field of Classification Search
USPC ....................................................... 396/257
See application file for complete search history.

(56) References Cited

U.S. PATENT DOCUMENTS

| | | | | | |
|---|---|---|---|---|---|
| 4,657,368 | A | * | 4/1987 | Kawamura | ..................... 396/262 |
| 5,459,511 | A | * | 10/1995 | Uehara et al. | ................. 348/335 |
| 5,710,950 | A | * | 1/1998 | Hozumi | ........................ 396/263 |
| 6,343,881 | B1 | * | 2/2002 | Yaginuma | ..................... 396/449 |
| 2005/0141890 | A1 | * | 6/2005 | Ohkura et al. | ................. 396/246 |
| 2009/0268075 | A1 | * | 10/2009 | Yumiki | ..................... 348/333.05 |
| 2013/0021514 | A1 | * | 1/2013 | Kamimura | ..................... 348/340 |
| 2013/0120637 | A1 | * | 5/2013 | Yumiki et al. | ................. 348/340 |
| 2013/0141622 | A1 | * | 6/2013 | Yamamoto | ............... 348/333.01 |

FOREIGN PATENT DOCUMENTS

| | | |
|---|---|---|
| JP | 63-205644 A | 8/1988 |
| JP | 2006-243372 A | 9/2006 |
| JP | 2009-053599 A | 3/2009 |
| JP | 2010-262173 A | 11/2010 |

OTHER PUBLICATIONS

Machine translation of Ouchi et al. (JP 2007-140255 A).*
Japanese Office Action issued on May 7, 2014 that issued in Japanese Patent Application No. 2012-154582.

* cited by examiner

*Primary Examiner* — Clayton E Laballe
*Assistant Examiner* — Linda B Smith
(74) *Attorney, Agent, or Firm* — Cowan, Liebowitz & Latman, P.C.

(57) ABSTRACT

A lens apparatus includes an aperture stop unit that adjusts light intensity, a terminal configured so that a voltage is applied in a state of connecting to an image pickup apparatus, a drive circuit that drives the aperture stop unit, and a controller that controls the drive circuit, the controller controls the drive circuit in a drive mode that drives the aperture stop unit from a first position to a second position without driving the aperture stop unit to an open position.

15 Claims, 6 Drawing Sheets

| DRIVE DIRECTION | STEP NUMBER | | | | | | | |
|---|---|---|---|---|---|---|---|---|
| | Fno1 | Fno2 | Fno3 | Fno4 | Fno5 | Fno6 | Fno7 | Fno8 |
| CLOSED SIDE | S1 | S2 | S3 | S4 | S5 | S6 | S7 | S7 |
| OPEN SIDE | S0 | S0 | S1 | S2 | S3 | S4 | S5 | S5 |

LENS APPARATUS AND IMAGE PICKUP APPARATUS CAPABLE OF CONTROLLING APERTURE STOP

BACKGROUND OF THE INVENTION

1. Field of the Invention

The present invention relates to an image pickup apparatus capable of controlling an aperture stop in continuous shootings.

2. Description of the Related Art

Previously, there is a variability in a stopping accuracy of an aperture stop due to a reverse backlash occurs in switching a drive direction, and in order to keep a stable accuracy of the aperture stop, the aperture stop needs to be opened once and then is closed (narrowed) again. Therefore, a continuous shooting speed in continuous shootings cannot be sufficiently increased due to the influence of a driving time of the aperture stop.

Japanese Patent Laid-Open No. 2010-262173 discloses an image pickup apparatus which is configured so that the aperture stop is not driven between time periods of an exposure for a second shot image is performed and an exposure for a first shot image is performed while a continuous shooting mode is set.

In the configuration disclosed in Japanese Patent Laid-Open No. 2010-262173, the continuous shooting speed in the continuous shootings is increased, however the exposure control cannot be performed by the aperture stop.

BRIEF SUMMARY OF THE INVENTION

The present invention provides an image pickup apparatus, a lens apparatus, and a camera system capable of performing high-speed continuous shootings while controlling an aperture stop.

A lens apparatus as one aspect of the present invention is a lens apparatus including a lens, the lens apparatus includes an aperture stop unit configured to adjust light intensity, a terminal configured so that a voltage is applied in a state of connecting to an image pickup apparatus, a drive circuit configured to drive the aperture stop unit, and a controller configured to control the drive circuit, the controller is capable of controlling the drive circuit in a drive mode that drives the aperture stop unit from a first position to a second position without driving the aperture stop unit to an open position.

An image pickup apparatus as another aspect of the present invention includes an image pickup element configured to perform a photoelectric conversion of an optical image formed via a lens apparatus in a state where the image pickup apparatus is connected to the lens apparatus, a terminal configured so that a signal is inputted from the lens apparatus in the state where the image pickup apparatus is connected to the lens apparatus, and a controller configured to control an aperture stop unit included in the lens apparatus in the state where the image pickup apparatus is connected to the lens apparatus, the controller is capable of controlling the aperture stop unit in a first drive mode or a second drive mode in the state where the image pickup apparatus is connected to the lens apparatus, when the aperture stop unit is driven from a first position to a second position, the first drive mode is a mode that drives the aperture stop unit to an open position and then drives the aperture stop unit to the second position, and when the aperture stop unit is driven from the first position to the second position, the second drive mode is a mode that drives the aperture stop unit to the second position without driving the aperture stop unit to the open position.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings. In each of the drawings, the same elements will be denoted by the same reference numerals and the duplicate descriptions thereof will be omitted.

Figure 1:
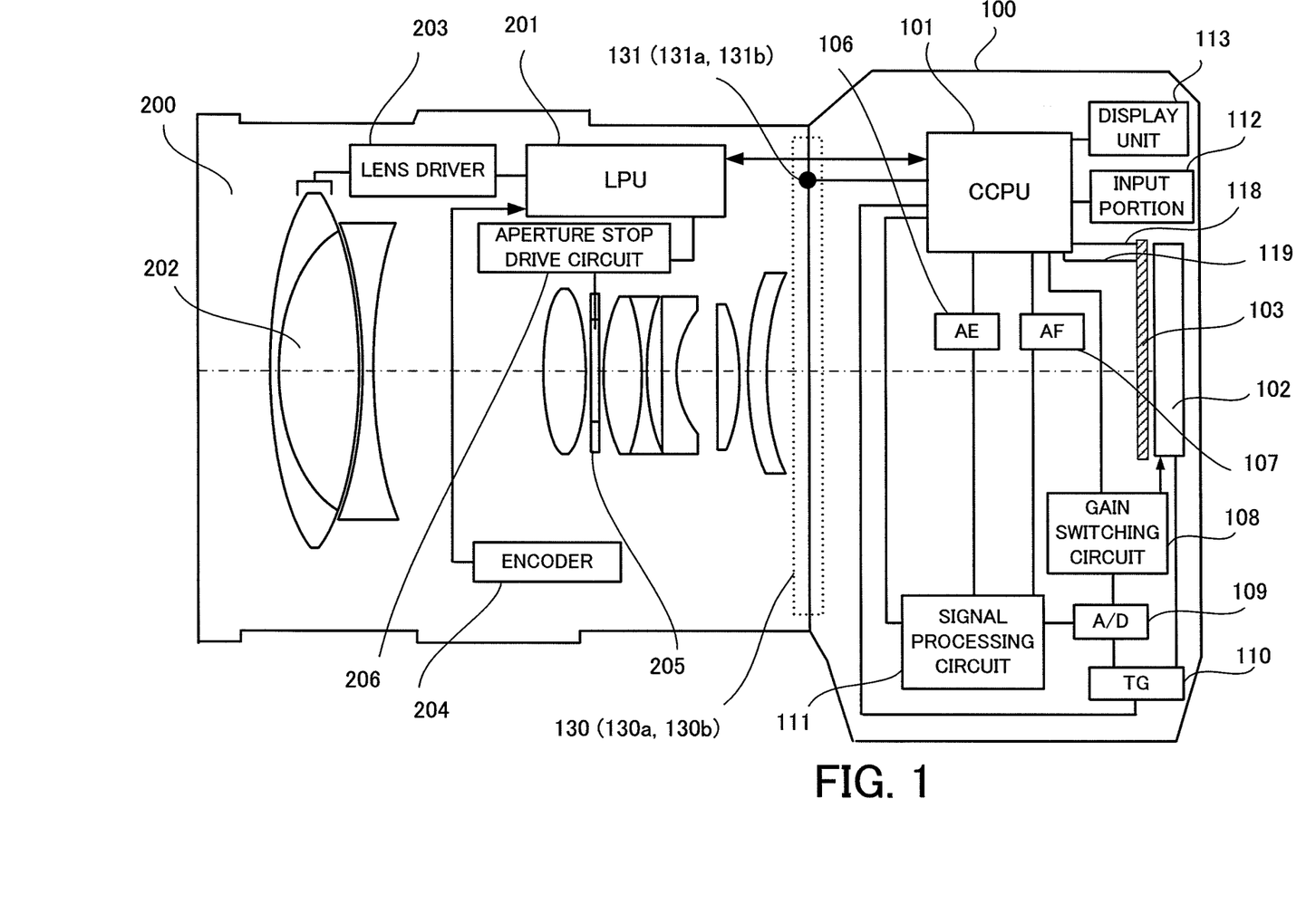
FIG. 1 is a block diagram of illustrating a configuration of an image pickup apparatus in each embodiment.

First of all, referring to FIG. 1, a schematic configuration of a camera system in the present embodiment will be described. FIG. 1 is a block diagram of illustrating a configuration of the camera system. In FIG. 1, reference numeral 100 denotes an image pickup apparatus (a camera, or an image pickup apparatus body), and reference numeral 200 denotes a lens apparatus (an interchangeable lens). Thus, the camera system of the present embodiment is configured by including the image pickup apparatus 100 and the lens apparatus 200 that is removably mounted on the image pickup apparatus 100.

A configuration and an operation of the image pickup apparatus 100 will be described. Reference numeral 101 denotes a camera microcomputer (a controller, or a CCPU) that is a system control circuit to control each part of the image pickup apparatus 100. The camera microcomputer 101 is configured so as to perform various kinds of controls for the camera system, and also determines various kinds of conditions. Reference numeral 102 denotes an image pickup element such as a CCD or a CMOS that includes an infrared cut filter, a low-pass filter, or the like. An object image (an optical image) is formed via a lens unit 202 of the lens apparatus 200, and the object image formed by the lens unit 202 is imaged on the image pickup element 102. The image pickup element 102 performs a photoelectric conversion of the object image.

Reference numeral 103 denotes a shutter that includes a control circuit. The shutter 103 is closed so as to block light from entering the image pickup element 102 when a shooting image is read out, and on the other hand, the shutter 103 is opened so as to introduce the light onto the image pickup element 102 when a live view or a shooting is performed. A control circuit of the shutter 103 controls the shutter 103 based on a shutter drive signal 118 from the camera microcomputer 101. In the present embodiment, the shutter 103 is a publicly-known focal plane shutter. The control circuit of the shutter 103 controls a shutter drive magnet that constitutes the focal plane shutter, and moves a shutter curtain so as to perform an exposure operation. In addition, the shutter 103 contains a publicly-known photo interrupter that detects a position of a blade of the shutter and that detects a timing of completion of moving the shutter or the like. The photo interrupter is connected to the camera microcomputer 101 via a signal line 119 that transmits a detected signal.

Reference numeral 106 denotes a photometric circuit. The photometric circuit 106 calculates image data taken by the image pickup element 102 in cooperation with a signal processing circuit 111 (a digital signal processing circuit) so as to perform an exposure control (an AE control). In other words, the photometric circuit 106 performs a photometry using information obtained from the image pickup element 102. Reference numeral 107 denotes a focus detection circuit. The focus detection circuit 107 calculates the image data taken by the image pickup element 102 in cooperation with the signal processing circuit 111 so as to perform a focus detection control (an AF control).

Reference numeral 108 denotes a gain switching circuit that switches a gain of a signal (an amplified signal) of the image pickup element 102. The switching of the gain is performed by the camera microcomputer 101 in accordance with an image pickup condition or an input by a user. Reference numeral 109 denotes an A/D converter that converts an analog signal amplified and obtained from the image pickup element 102 into a digital signal. Reference numeral 110 denotes a timing generator (TG) that synchronizes an input of the amplified signal of the image pickup element 102 with a conversion timing of the A/D converter 109. Reference numeral 111 denotes a signal processing circuit that performs an image processing for the image data converted into the digital signal by the A/D converter 109 in accordance with a parameter. Descriptions of a storage portion such as a memory that stores the processed image are omitted.

Reference numeral 130 denotes a mount that mounts the lens apparatus 200 on the image pickup apparatus 100. Reference numeral 130a denotes a camera mount that is provided at a side of the image pickup apparatus 100, and reference numeral 130b denotes a lens mount that is provided at a side of the lens apparatus 200. The mount 130 includes a terminal (a communication terminal) that sends data from a lens microcomputer 201 to the camera microcomputer 101, which enables a communication between the camera microcomputer 101 and the lens microcomputer 201. The mount 130 is provided with a DTEF terminal 131 (a DTEF terminal 131a of the camera mount 130a and a DTEF terminal 131b of the lens mount 130b) that is connected to an A/D port of the camera microcomputer 101, as well as the communication terminal. The DTEF terminal 131 (131a, 131b) is configured so that a voltage (a predetermined voltage) is applied in a state where the image pickup apparatus 100 is connected to the lens apparatus 200. In other words, an output signal (a voltage) from a lens-type determining portion (not shown) that determines a type of the lens apparatus 200 is inputted to the DTEF terminal 131 (131a, 131b). This output signal is a signal relating to the type of the lens apparatus 200. This output signal is inputted to the camera microcomputer 101 via the DTEF terminal 131, and thus the camera microcomputer 101 can determine the type of the lens apparatus 200 mounted on the image pickup apparatus 100.

Reference numeral 112 denotes various kinds of input portions. The input portion 112 is configured by including a release button, a switch, a button, or a dial of switching a single shooting mode and a continuous shooting mode, and the like, which is capable of inputting a setting of the image pickup apparatus 100 and the like from its outside. Reference numeral 113 denotes a display unit that is configured by a liquid crystal device, a light emitting element, or the like that displays various kinds of set modes or other image pickup information.

Subsequently, a configuration and an operation of the lens apparatus 200 will be described. Reference numeral 201 denotes a lens microcomputer (a controller, or an LPU) that controls the operation of each portion of the lens apparatus 200. The lens microcomputer 201 performs the control of the lens apparatus 200 and determines various kinds of conditions. Reference numeral 202 denotes a lens unit that is configured by a plurality of lenses. Reference numeral 203 denotes a lens driver that moves an optical system for adjusting a focal position of the lens unit 202. A driving amount of the lens unit 202 is calculated by the camera microcomputer 101 based on an output of the focus detection circuit 107 of the image pickup apparatus 100.

Reference numeral 204 denotes an encoder that detects a position of the lens unit 202. The driving amount of the lens unit 202 calculated by the camera microcomputer 101 is communicated from the camera microcomputer 101 to the lens microcomputer 201. Then, the lens microcomputer 201 performs a drive control of the lens driver 203 using position information of the lens unit 202 detected by the encoder 204 and the driving amount calculated by the camera microcomputer 101. Thus, the lens unit 202 is moved to an in-focus position by the lens driver 203.

Reference numeral 205 denotes an aperture stop (an aperture stop unit) that adjusts light intensity. Reference numeral 206 denotes an aperture stop drive circuit (a drive circuit) that drives the aperture stop 205. The lens microcomputer 201 controls the aperture stop drive circuit 206 in a state where the image pickup apparatus 100 is connected to the lens apparatus 200 so as to perform the drive control of the aperture stop 205. A driving amount of the aperture stop that is required to control the aperture stop 205 is notified by the communication from the camera microcomputer 101 to the lens microcomputer 201. In the present embodiment, a focal length of the lens unit 202 is a single focal length (a fixed focal length), but the embodiment is not limited to this, and the focal length of the lens unit 202 may also be a zoom lens or the like which is variable.

Figure 2:
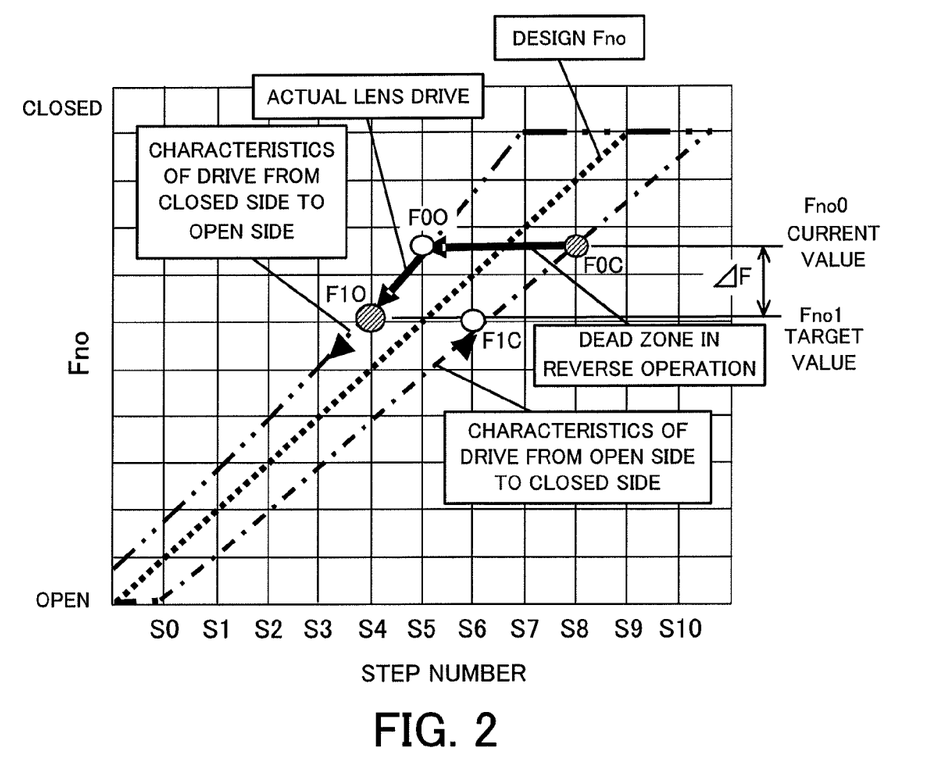
FIG. 2 is a schematic diagram of illustrating characteristics of a motion of an aperture stop in each embodiment.

Next, referring to FIG. 2, a reverse backlash due to the aperture stop control in the lens apparatus 200 will be described. FIG. 2 is a schematic diagram of illustrating characteristics of the operation of the aperture stop 205 in the lens apparatus 200. In FIG. 2, driving characteristics in a direction from an open state (a full-open state) to a small aperture state (a closed state) of the aperture stop 205 are indicated by a dashed-dotted line, and driving characteristics in a direction from the small aperture state to the open state are indicated by a dashed-two dotted line.

In order to further close the aperture stop 205 by $\Delta F$ so as to be driven from a state F1C in which the aperture stop 205 is closed from an open position (a full-open position) to a position of an aperture stop value Fno1 to a position of an aperture stop value Fno0, a two-step drive may be performed in accordance with design characteristics indicated by a dotted line. In order to open the aperture stop 205 again to the open side by $\Delta F$ from a state F0C in which the aperture stop 205 is driven up to the aperture stop value Fno0 in the direction of the small aperture state, even when the two-step drive that is the same as that of the drive in the direction of the small aperture state is performed, the aperture stop 205 is not actually driven due to an influence of the backlash, and instead, a four-step drive from Steps S8 to S4 is required.

Figure 3:
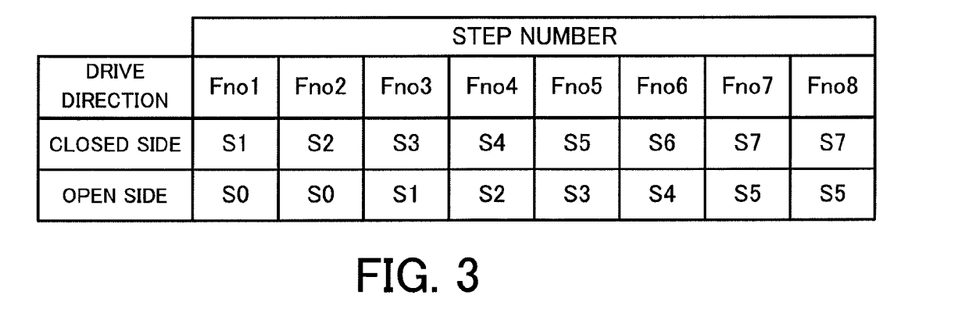
FIG. 3 is one example of a table of driving the aperture stop in each embodiment.

Subsequently, referring to FIG. 3, a table of driving the aperture stop that is used in a method of controlling the aperture stop in continuous shootings will be described. FIG. 3 is one example of the table of driving the aperture stop. In order to solve a problem of the reverse backlash in the drive of the aperture stop, the lens apparatus 200 has the table of driving the aperture stop to control a removal of the backlash illustrated in FIG. 3. This table of driving the aperture stop is made based on data measured by the following method.

First of all, while the lens apparatus 200 is driven each step from an open side (a full-open side) to a small aperture side (a closed side), a value Fno is measured for each drive. Subsequently, while the lens apparatus 200 is driven each step from the small aperture side to the open side, the value Fno is measured for each drive. Then, a step position where an error between the value Fno for each step and a design value Fno is minimized is extracted so as to be stored as a table. Table data made like this at the time of designing or manufacturing the lens apparatus 200 are stored in a ROM (a storage portion) of the lens microcomputer 201, and thus the lens apparatus 200 can be adapted to, i.e. support, a relative drive of the aperture stop 205. In other words, the lens apparatus 200 is provided with the ROM (the storage portion) that stores information relating to a drive difference between a case where the aperture stop 205 is driven from the open side to the small aperture side and a case where the aperture stop 205 is driven from the small aperture side to the open side. Then, the lens microcomputer 201 uses information relating to the drive difference in a second drive mode described below.

On the other hand, since making such table data may be troublesome, it is not necessarily made for all interchangeable lens units. For example, when a lens that is a wide-angle lens in which it is assumed that high-speed continuous shootings are not necessary is used, the lens may be configured without the table data. This is, as described below, because it is determined whether the lens apparatus 200 on which the image pickup apparatus 100 is mounted supports the relative drive of the aperture stop, i.e. whether correction table for removing the backlash is stored, so as to switch the drive control of the aperture stop. As a result, when the lens apparatus 200 which supports the relative drive of the aperture stop is mounted, the high-speed continuous shootings can be performed while maintaining a diameter accuracy of the aperture stop. On the other hand, for a lens which does not support the relative drive of the aperture stop, the drive is performed to an open position once and then the drive is necessarily performed in a direction of the small aperture state for the aperture stop in shooting so as to perform a control to ensure the diameter accuracy.

In the present embodiment, as the method of ensuring the diameter accuracy of the aperture stop at the time of reversing the drive of the aperture stop as well, a method of storing correction data table in the ROM of the lens microcomputer 201 is described. However, the method of ensuring the diameter accuracy during the relative drive is not limited to this, and a method of obtaining the number of correction steps using various kinds of calculation results, as well as the ROM table, may also be used.

Figure 4:
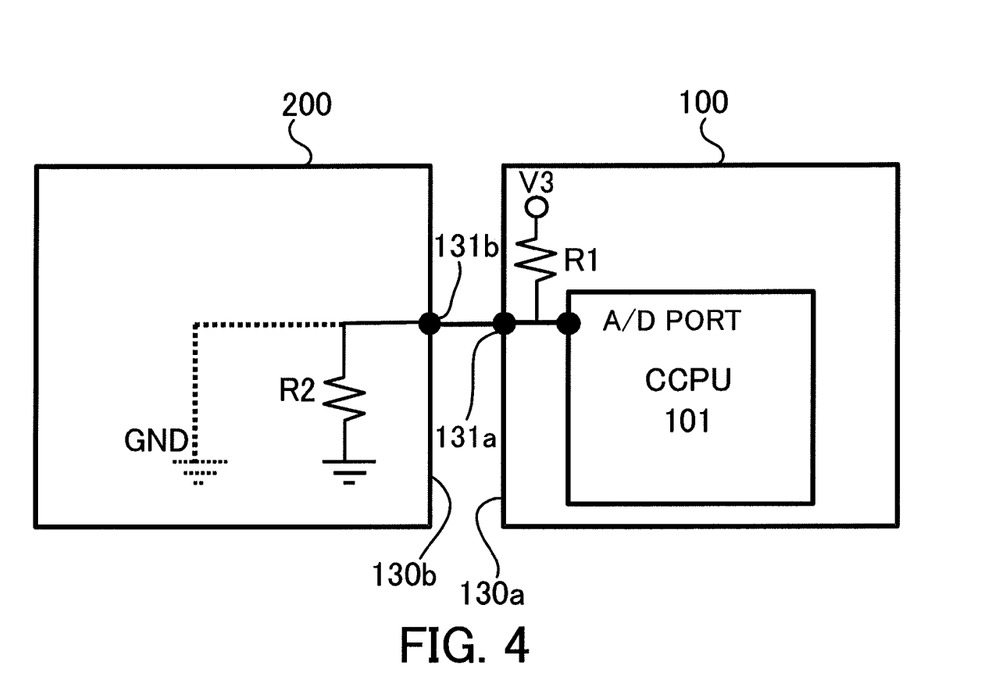
FIG. 4 is a configuration diagram of a lens apparatus determining portion in each embodiment.

Next, referring to FIG. 4, a method of determining whether the lens apparatus 200 mounted on the image pickup apparatus 100 supports the relative drive of the aperture stop 205, i.e. whether the diameter accuracy is ensured even when the relative drive of the aperture stop is performed, will be described. FIG. 4 is a configuration diagram of a lens apparatus determining portion in the present embodiment.

In FIG. 4, reference numeral 100 denotes the image pickup apparatus, and reference numeral 200 denotes the lens apparatus. The DTEF terminal 131 (131a, 131b) of the mount 130 (the camera mount 130a, and the lens mount 130b) is connected to the A/D port of the camera microcomputer 101. The DTEF terminal 131a at the side of the image pickup apparatus 100 is pulled up to a power source V3 by a predetermined pull-up resistor R1 inside the image pickup apparatus 100. The DTEF terminal 131b at the side of the lens apparatus 200 is pulled down by a predetermined pull-down resistor R2 as indicated by a solid line in FIG. 4 when the lens apparatus 200 supports the relative drive of the aperture stop. On the other hand, when the lens apparatus 200 does not support the relative drive of the aperture stop 205, a ground connection (GND connection) is performed as indicated by a dotted line in FIG. 4.

For example, a case where the pull-up resistor R1 at the side of the image pickup apparatus 100 is 100 kΩ and the pull-down resistor R2 at the side of the lens apparatus 200 is 300 kΩ is considered. In this case, a voltage corresponding to ¾ (three quarters) of the pull-up voltage V3 is applied to the A/D port of the camera microcomputer 101. On the other hand, when the lens apparatus which does not support the relative drive of the aperture stop 205 is mounted, a voltage corresponding to 0V is applied to the A/D port of the camera microcomputer 101. Therefore, the camera microcomputer 101 sets for example a voltage corresponding to ¼ (one quarter) of the pull-up voltage V3 as a determination threshold value. When the voltage applied to the A/D port exceeds this determination threshold value, the camera microcomputer 101 determines that the mounted lens apparatus supports the relative drive of the aperture stop. On the other hand, when the voltage applied to the A/D port is below this determination threshold value, the camera microcomputer 101 determines that the mounted lens apparatus does not support the relative drive of the aperture stop.

The present embodiment describes the case where the DTEF terminal 131b at the side of the lens apparatus 200 is grounded (GND connection is performed) with 0 Ω when the lens apparatus 200 does not support the relative drive of the aperture stop 205, but the embodiment is not limited to this. For example, the determination can be performed at the side of the image pickup apparatus 100 even when for example a resistor value of the pull-down resistor R2 is set to a value different from a resistor value of the lens apparatus which supports the relative drive of the aperture stop 205. As a result, the image pickup apparatus 100 can appropriately identify the lens apparatus which supports the relative drive of the aperture stop 205.

The present embodiment describes the method of determining the lens apparatus 200 by using the voltage inputted to the DTEF terminal 131 of the mount 130 as a method of determining the lens apparatus 200, but the embodiment is not limited to this. For example, the determination may also be performed by communication using the communication terminal of the mount 130.

Figure 5A:
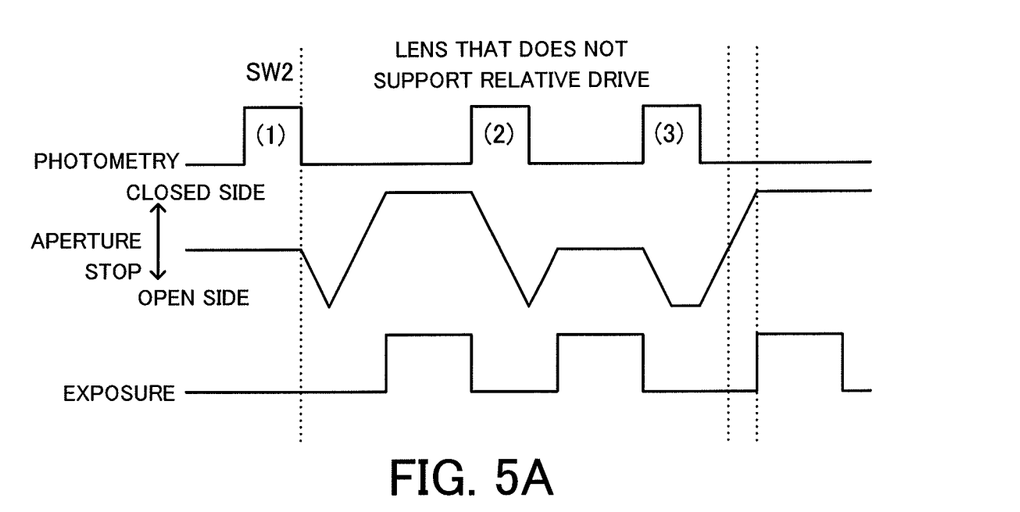
FIGS. 5A and 5B are sequences of a method of controlling the aperture stop in each embodiment.
Figure 5B:
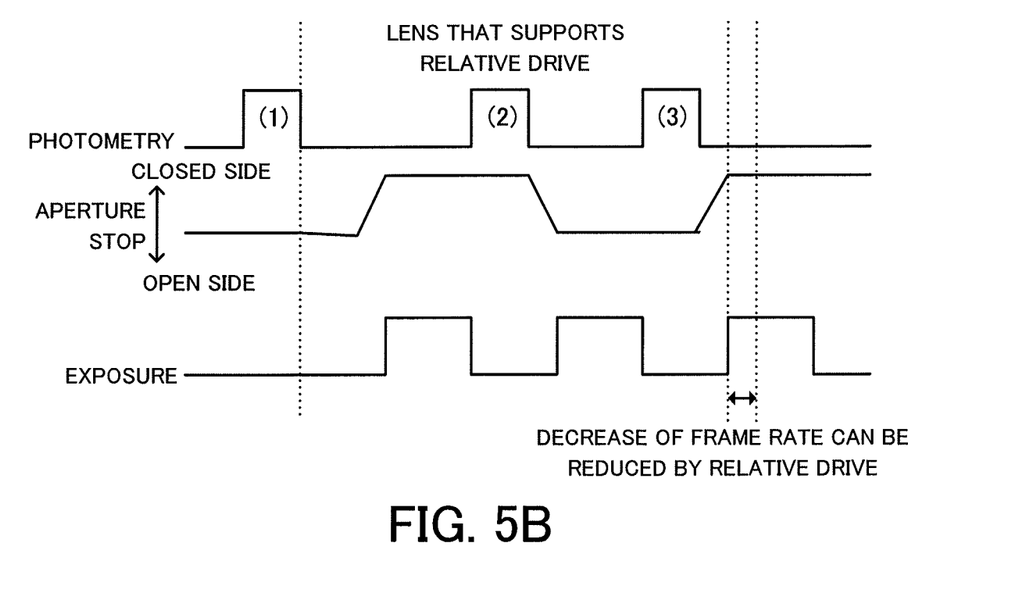

Next, referring to FIGS. 5A and 5B, the operation of the camera system during the continuous shootings will be described. FIGS. 5A and 5B are sequences of methods of controlling the aperture stop during the continuous shootings. FIG. 5B illustrates an operation in a case where a lens apparatus which supports the relative drive of the aperture stop (a lens that supports the relative drive) is mounted, and FIG. 5A illustrates an operation in a case where a lens apparatus which does not support the relative drive of the aperture stop (a lens that does not support the relative drive) is mounted. The term "a lens that supports the relative drive" means, between a first shooting (first exposure) and a second shooting (second exposure) in the continuous shootings, a lens that is capable of relatively driving the aperture stop from an aperture stop value (an F-number) at the time of the first shooting to the aperture stop value (the F-number) at the time of the second shooting without driving the aperture stop up to the open position (the full-open position) once. On the other hand, the term "a lens that does not support the relative drive" means a lens in which the aperture stop needs to be driven to the open position once and thus the relative drive cannot be performed between the first shooting and the second shooting in the continuous shootings.

A common photometry that is performed before the shooting is a first photometry (1) indicated in FIGS. 5A and 5B, which is performed by using the image pickup element 102 as a photometry using a real aperture stop. On the other hand, a photometry which is performed in the continuous shootings is a second photometry (2) and a third photometry (3) indicated in FIGS. 5A and 5B. In the present embodiment, a photometry processing in the continuous shootings is performed by the signal processing circuit 111 using a last shot image. When the lens apparatus 200 does not support the relative drive of the aperture stop, the aperture stop is driven to be an open state once before the exposure. On the other hand, when the lens apparatus 200 supports the relative drive of the aperture stop, the aperture stop is driven to an aperture stop position obtained based on the photometry result without opening the aperture stop before the exposure, and therefore the decrease in speed of the continuous shootings caused by controlling the aperture stop is prevented.

Embodiment 1

Figure 6:
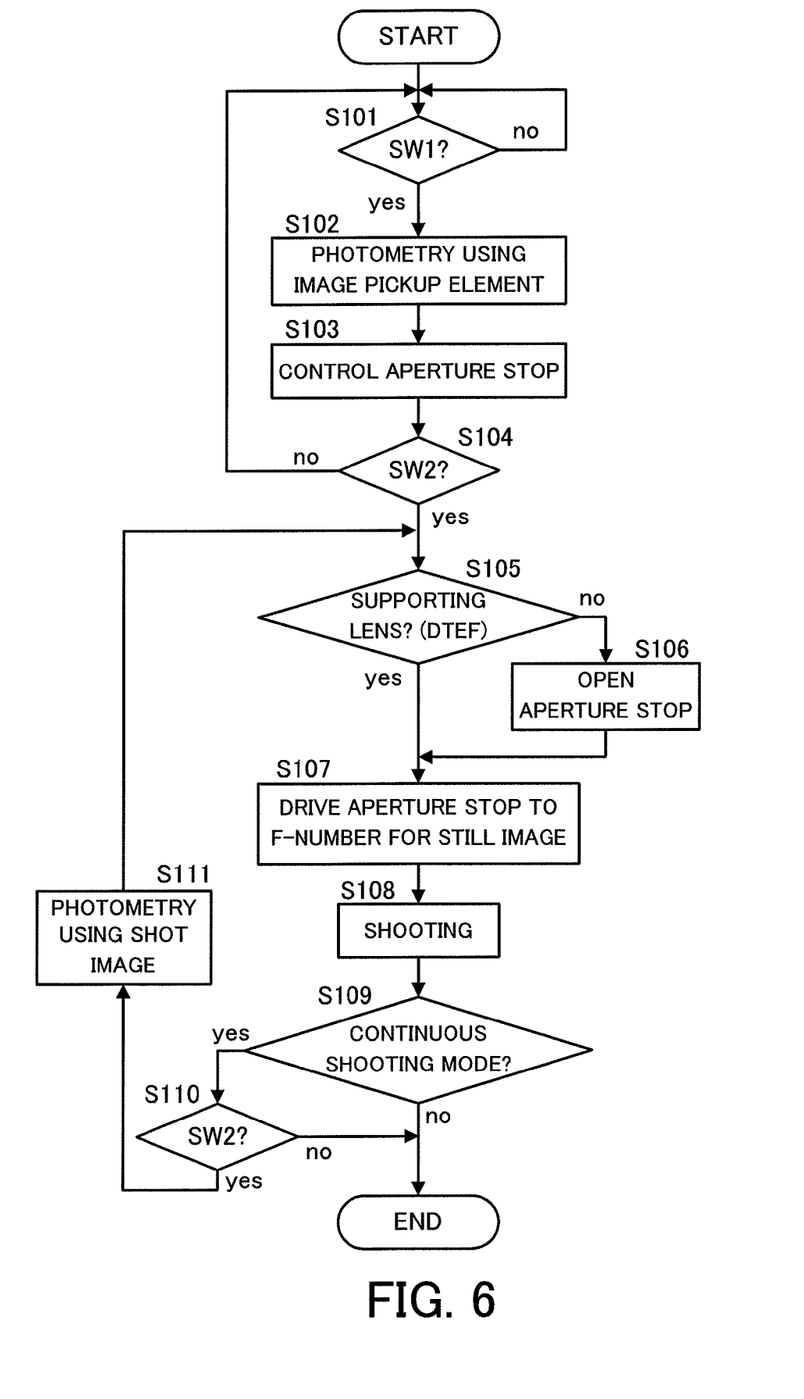
FIG. 6 is a flowchart of a method of controlling the aperture stop in Embodiment 1.

Next, referring to FIG. 6, a method of controlling the aperture stop in the continuous shootings in Embodiment 1 of the present invention will be described. FIG. 6 is a flowchart of the method of controlling the aperture stop in the present embodiment. Each step of FIG. 6 is performed based on an instruction of the camera microcomputer 101 (or the lens microcomputer 201) in accordance with a program stored in the camera microcomputer 101.

First of all, in Step S101, the camera microcomputer 101 determines whether SW1 that is a state in which a shutter button (not shown) included in the input portion 112 is pressed halfway is ON. When the SW1 is OFF, the camera microcomputer 101 waits for the input of the shutter button and therefore Step S101 is repeated. On the other hand, when the SW1 is ON, the flow proceeds to Step S102. In Step S102, the photometric circuit 106 performs a photometric processing using a signal obtained from the image pickup element 102. Subsequently, in Step S103, the aperture stop drive circuit 206 controls the aperture stop 205 so as to be set to an appropriate aperture stop value (an appropriate F-number) in accordance with the result of the photometric processing.

Next, in Step S104, the camera microcomputer 101 determines whether SW2 that is a state in which the shutter button (not shown) included in the input portion 112 is fully pressed is ON. When the SW2 is OFF, the camera microcomputer 101 waits for the input of the shutter button, and Steps S101 to S104 are repeated. On the other hand, when the SW2 is ON, the flow proceeds to Step S105.

In Step S105, the camera microcomputer 101 determines whether the lens apparatus 200 mounted on the image pickup apparatus 100 supports the relative drive of the aperture stop 205. This determination is performed based on a signal inputted from the DTEF terminal 131a, i.e. based on whether the voltage value of the DTEF terminal 131a of the camera mount 130a exceeds a predetermined value. The specific determining method is as described above.

In Step S105, when it is determined that the lens apparatus 200 does not support the relative drive of the aperture stop S205, the flow proceeds to Step S106 and the aperture stop 205 is fully opened. After the aperture stop 205 is opened, the flow proceeds to Step S107. On the other hand, in Step S105, when it is determined that the lens apparatus 200 supports the relative drive of the aperture stop 205, the flow proceeds to Step S107. In Step S107, based on an instruction of the camera microcomputer 101 (the lens microcomputer 201), the aperture stop drive circuit 206 drives the aperture stop 205 to the F-number (the F-number for a still image) obtained by performing the exposure calculation based on the result of the photometric processing in Step S102.

Thus, when the lens apparatus 200 does not support the relative drive of the aperture stop 205, first of all, the aperture stop 205 is driven from a current position (a first position) to the open position (Step S106). Then, the aperture stop 205 is driven from the open position to a position (a second position) which is determined based on the photometric processing (Step S102 or S111). An aperture stop drive mode when the lens apparatus 200 is the lens that does not support the relative drive is referred to as a first drive mode. On the other hand, when the lens apparatus 200 supports the relative drive of the aperture stop 205, the aperture stop 205 is driven from the current position (the first position) to the position (the second position) which is determined based on the photometric processing (Step S102 or S111) without driving the aperture stop 205 to the open state. An aperture stop drive mode when the lens apparatus 200 is the lens that supports the relative drive is referred to as a second drive mode.

Subsequently, in Step S108, an image is taken and then the flow proceeds to Step S109. In Step S109, the camera microcomputer 101 determines whether the shooting mode of the image pickup apparatus 100 is set to a continuous shooting mode. When the shooting mode is a single shooting mode, the shooting is finished. On the other hand, when the shooting mode is the continuous shooting mode, the flow proceeds to Step S110, and the camera microcomputer 101 determines whether the SW2 is ON. When the SW2 is OFF, the shooting is finished. On the other hand, when the SW2 is ON, the flow proceeds to Step S111. In Step S111, the photometric circuit 106 performs the photometric processing. The photometric processing in Step S111 is performed in cooperation with the signal processing circuit 111 using the image data (the last shot image) obtained by the shooting in last Step S108. In other words, the position (the second position) of the aperture stop 205 is determined based on the photometric processing by the signal processing circuit 111. Then, the flow proceeds to Step S105, and the subsequent processing is repeated.

According to the present embodiment, whether the lens apparatus mounted on the image pickup apparatus supports the relative drive of the aperture stop, i.e. whether the correction table for removing the backlash is stored, is determined. Then, the control for driving the aperture stop is switched in accordance with this determination result, and therefore high-speed continuous shootings can be performed in a state where the diameter accuracy of the aperture stop is maintained when the lens apparatus that supports the relative drive of the aperture stop is mounted. On the other hand, when the lens apparatus that does not support the relative drive of the aperture stop is mounted, the aperture stop is driven to the open state once and then is driven in the direction of the small aperture, and therefore the diameter accuracy of the aperture stop can be ensured.

Embodiment 2

Figure 7:
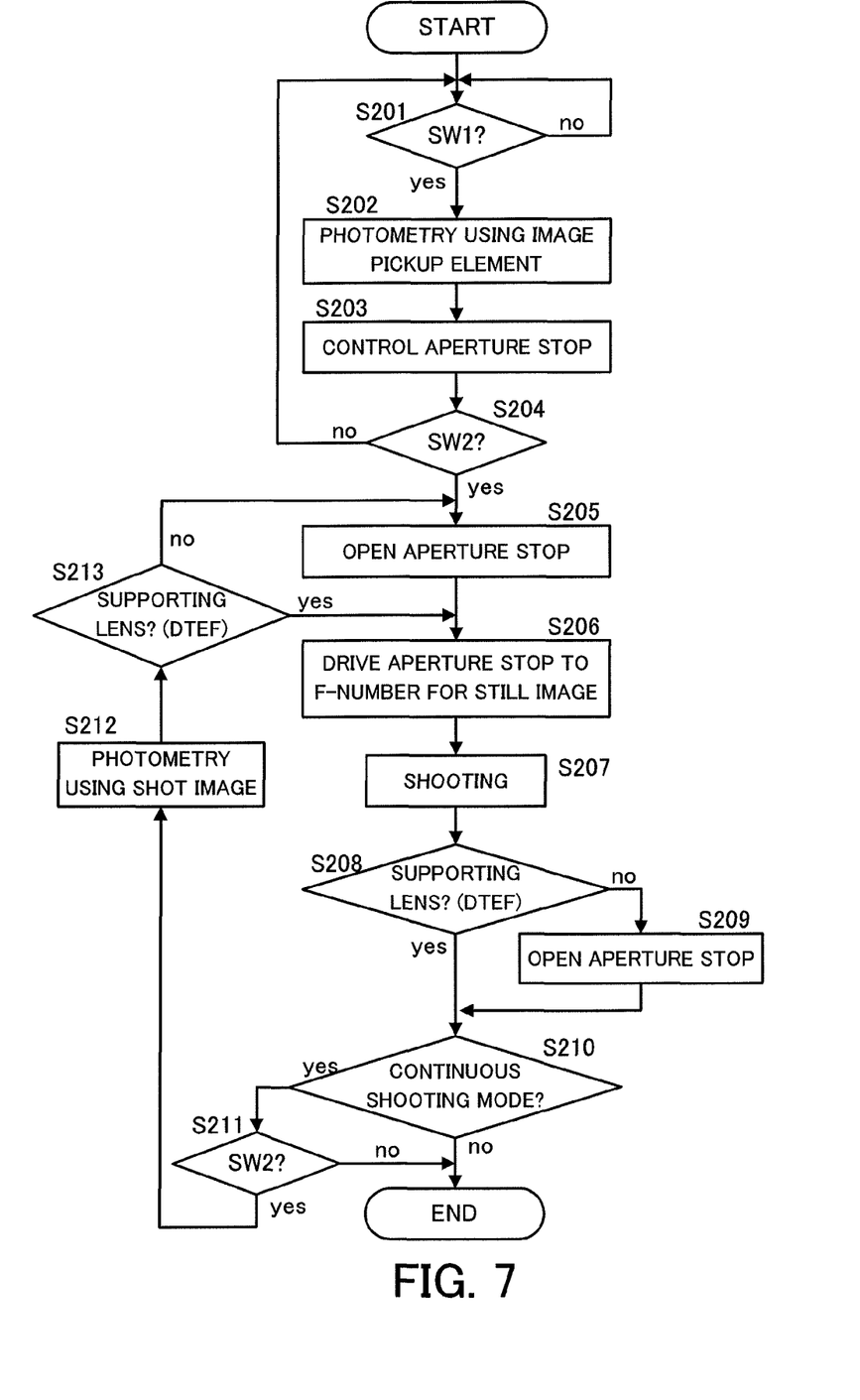
FIG. 7 is a flowchart of a method of controlling the aperture stop in Embodiment 2.

Next, referring to FIG. 7, a method of controlling the aperture stop in the continuous shootings in Embodiment 2 of the present invention will be described. In the present embodiment, the control is performed so that a method of controlling the aperture stop for a first frame in the continuous shootings is different from a method of controlling the aperture stop for a second frame in the continuous shootings. FIG. 7 is a flowchart of the method of controlling the aperture stop in the present embodiment. Each step in FIG. 7 is performed based on an instruction of the camera microcomputer 101 (or the lens microcomputer 201) in accordance with a program stored in the camera microcomputer 101.

The lens apparatus 200 includes a table of driving the aperture stop that is used to remove the backlash as illustrated in FIG. 3. However, the reverse backlash generated by driving the aperture stop is different in accordance with a drive speed of the aperture stop 205. In particular, when there are a lot of variations of the drive speed of the aperture stop 205, a data amount of the table of driving the aperture stop that is used to remove the backlash is extremely large. The increase of the data amount of the table of driving the aperture stop leads to the increase of memory capacity to store the data amount, which causes the increase of cost. In addition, since an extremely-large amount of man-hour is necessary for extracting the data, it may be difficult to prepare the correction table for all of the drive speeds of the aperture stop 205 which is capable of being driven at a plurality of speeds. Therefore, in the present embodiment, the drive speed of the aperture stop at the time of shooting a still image is set to be constant, and a drive table for controlling the removal of the backlash which corresponds to the constant drive speed is prepared.

First of all, in Step S201 of FIG. 7, the camera microcomputer 101 determines whether SW1 that is a state where the shutter button (not shown) included in the input portion 112 is pressed halfway is ON. When the SW1 is OFF, the camera microcomputer 101 waits for the input of the shutter button, and Step S201 is repeated. On the other hand, when the SW1 is ON, the flow proceeds to Step S202. In Step S202, the photometric circuit 106 performs the photometric processing using the signal obtained from the image pickup element 102.

Subsequently, in Step S203, the aperture stop drive circuit 206 controls the aperture stop so as to set the aperture stop 205 to be an aperture stop value (an F-number) which is appropriate in accordance with the result of the photometric processing. In the embodiment, while the aperture stop is controlled so as to be set to the aperture stop value (the F-number) which is appropriate in accordance with the result of the photometric processing, the luminance in the live view display may be temporarily changed. This is because the aperture stop value (the F-number) is significantly changed between frames of the live view and an exposure control for an appropriate display cannot be temporarily performed. Therefore, it is preferred that the speed of driving the aperture stop 205 (the drive speed of the aperture stop) is decreased so that the change of the luminance is gradual in the live view display. In this case, the speed of driving the aperture stop is adjusted in accordance with a drive amount necessary for the aperture stop 205, and thus it does not take unnecessarily long time to drive the aperture stop.

Next, in Step S204, the camera microcomputer 101 determines whether SW2 that is a state in which the shutter button (not shown) included in the input portion 112 is fully pressed is ON. When the SW2 is OFF, the camera microcomputer 101 waits for the input of the shutter button, and Steps S201 to S204 are repeated. On the other hand, when the SW2 is ON, the flow proceeds to Step S205.

In Step S205, the aperture stop 205 is fully opened once. In other words, when a first shooting of the continuous shootings is performed, the camera microcomputer 101 drives the aperture stop 205 to the open position and then drives it from the open position to a position (a first position) which is determined based on the photometric processing (Step S202) of the photometric circuit 106. This is because the drive speed of the aperture stop is not constant when controlling the aperture stop in the live view. Even when the lens apparatus 200 that supports the relative drive of the aperture stop 205, i.e. the lens apparatus 200 that has control data for removing the backlash of the aperture stop 205 is used, the diameter accuracy may not be exactly ensured depending on the last drive speed of the aperture stop.

Subsequently, in Step S206, based on an instruction of the camera microcomputer 101 (the lens microcomputer 201), the aperture stop drive circuit 206 drives the aperture stop 205 to the aperture stop value (the F-number) obtained by performing the exposure calculation based on the result of the photometric processing in Step S202. In other words, the camera microcomputer 101 (the lens microcomputer 201) controls the aperture stop 205 so as to be driven to the open position in the first shooting of the continuous shootings, and then controls the aperture stop drive circuit 206 in a second mode. After an image is taken in Step S207, the flow proceeds to Step S208.

In Step S208, the camera microcomputer 101 determines whether the lens apparatus 200 mounted on the image pickup apparatus 100 supports the relative drive of the aperture stop 205. This determination is performed based on a signal inputted from the DTEF terminal 131a, i.e. based on whether a voltage of the DTEF terminal 131a of the camera mount 130a exceeds a predetermined value. Specific determination method is as described above.

In Step S208, when it is determined that the lens apparatus 200 does not support the relative drive of the aperture stop 205, the flow proceeds to Step S209 and the aperture stop 205 is fully opened. After the aperture stop 205 is opened, the flow proceeds to Step S210. On the other hand, in Step S208, when it is determined that the lens apparatus 200 supports the relative drive of the aperture stop 205, the flow proceeds to Step S210.

In Step S210, the camera microcomputer 101 determines whether the shooting mode of the image pickup apparatus 100 is set to a continuous shooting mode. When the shooting mode is a single shooting mode, the shooting is finished. On the other hand, when the shooting mode is the continuous shooting mode, the flow proceeds to Step S211, and the camera microcomputer 101 determines whether the SW2 is ON. When the SW2 is OFF, the shooting is finished. On the other hand, when the SW2 is ON, the flow proceeds to Step S212. In Step S212, the photometric circuit 106 performs the photometric processing. The photometric processing in Step S212 is performed in cooperation with the signal processing circuit 111 using the image data (the last shot image) obtained by the shooting in last Step S207. Then, the flow proceeds to Step S213.

In Step S213, similarly to Step S208, the camera microcomputer 101 determines whether the lens apparatus 200 supports the relative drive of the aperture stop 205. When it is determined that the lens apparatus 200 does not support the relative drive of the aperture stop 205, the flow proceeds to Step S205. On the other hand, it is determined that the lens apparatus 200 supports the relative drive of the apparatus stop 205, the flow proceeds to Step S206. Then, the subsequent processing is repeated.

According to the present embodiment, for a first frame (a first shooting) of continuous shootings when a live view is switched to an image shooting operation, an aperture stop is fully opened regardless of a type of a lens apparatus. On the other hand, for a second frame and subsequent to the second frame (a second shooting and subsequent shootings), similarly to Embodiment 1, a control of driving the aperture stop is switched in accordance with whether the lens apparatus supports the relative drive of the aperture stop, i.e. whether a correction table for removing the backlash is stored. Therefore, holding only correction data that corresponds to a predetermined drive speed of the aperture stop, high-speed continuous shootings in a state where the diameter accuracy of the aperture stop is maintained can be realized by a configuration with a small-capacity memory and with low cost when the lens apparatus that supports the relative derive of the aperture stop is mounted. On the other hand, when the lens apparatus that does not support the relative drive of the aperture stop is mounted, the aperture stop is always driven to the open state and then is driven in the direction of the small aperture state, and thus the diameter accuracy of the aperture stop can be ensured.

According to each of the embodiments described above, an image pickup apparatus, a lens apparatus, and a camera system capable of performing high-speed continuous shootings while controlling an aperture stop can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-154582, filed on Jul. 10, 2012, which is hereby incorporated by reference herein in its entirety.

What is claimed is:

1. A lens apparatus including a lens, comprising:
an aperture stop unit configured to adjust light intensity;
a drive circuit configured to drive the aperture stop unit; and
a controller configured to control the drive circuit,
wherein the controller is capable of controlling the drive circuit in a first mode and in a second mode,
wherein, in the first mode, the controller drives the aperture stop unit from a first position to a second position by way of an open position between each exposure, and
wherein, in the second mode, the controller drives the aperture stop unit from the first position to the second position directly, differently from the first mode, without driving the aperture stop unit to the open position between each exposure.

2. The lens apparatus according to claim 1, further comprising a terminal configured so that a voltage is applied in a state of connecting to an image pickup apparatus, wherein the voltage that is applied to the terminal is a signal relating to a type of the lens apparatus that enables the image pickup apparatus to determine whether the lens apparatus supports the second mode of driving the aperture stop unit.

3. The lens apparatus according to claim 1, wherein the controller controls the drive circuit in a state where the lens apparatus is connected to the image pickup apparatus.

4. The lens apparatus according to claim 2, wherein the controller controls the drive circuit based on an instruction of the image pickup apparatus in a state where the lens apparatus is connected to the image pickup apparatus.

5. The lens apparatus according to claim 1, wherein the controller is capable of controlling the drive circuit in the first mode or in the second mode when performing continuous shootings.

6. The lens apparatus according to claim 1, wherein the second position is a position that is determined based on a photometric processing.

7. The lens apparatus according to claim 1, wherein the controller controls the drive circuit so as to drive the aperture stop unit to the open position and then controls the drive circuit in the second mode when performing a first shooting of continuous shootings.

8. The lens apparatus according to claim 7, wherein the drive circuit is capable of driving the aperture stop unit at a plurality of speeds.

9. The lens apparatus according to claim 2, wherein the lens apparatus enables the image pickup apparatus to determine whether the lens apparatus supports the second mode based on whether the voltage applied to the terminal exceeds a predetermined value in a state where the lens apparatus is connected to the image pickup apparatus.

10. The lens apparatus according to claim 1, further comprising a storage portion that stores information relating to a drive difference between a case where the aperture stop unit is driven from an open side to a small aperture side and a case where the aperture stop unit is driven from the small aperture side to the open side.

11. The lens apparatus according to claim 10, wherein the controller uses the information in the drive mode.

12. An image pickup apparatus comprising:
an image pickup element configured to perform a photoelectric conversion of an optical image formed via a lens apparatus in a state where the image pickup apparatus is connected to the lens apparatus;
a terminal configured so that a voltage is detected from a terminal of the lens apparatus in the state where the image pickup apparatus is connected to the lens apparatus; and
a controller configured to control an aperture stop unit included in the lens apparatus in the state where the image pickup apparatus is connected to the lens apparatus,
wherein the controller is capable of controlling the aperture stop unit in a first mode and in a second mode in the state where the image pickup apparatus is connected to the lens apparatus,
wherein, in the first mode, the controller drives the aperture stop unit from a first position to a second position by way of an open position between each exposure, and
wherein, in the second mode, the controller drives the aperture stop unit from the first position to the second position directly, differently from the first mode, without driving the aperture stop unit to the open position between each exposure.

13. The image pickup apparatus according to claim 12, further comprising a photometric circuit configured to perform a photometry using information obtained from the image pickup element,
wherein the controller drives the aperture stop unit to the open position and then drives the aperture stop unit from the open position to the first position determined based on a photometric processing of the photometric circuit when performing a first shooting of continuous shootings.

14. The image pickup apparatus according to claim 12, further comprising a signal processing circuit configured to perform a photometric processing using a last shot image in continuous shootings,
wherein the second position is determined based on the photometric processing by the signal processing circuit.

15. The image pickup apparatus according to claim 12, wherein the controller determines whether the lens apparatus supports the second mode based on a voltage of a signal inputted to the terminal provided on a mount of the image pickup apparatus exceeds a predetermined value.

* * * * *